(12) United States Patent
Mistri et al.

(10) Patent No.: US 11,462,975 B2
(45) Date of Patent: Oct. 4, 2022

(54) MACHINE AND PROCESS OF COPPER ROTOR DIE CASTING USED IN AC ELECTRIC MOTOR

(71) Applicants: Zakir Husein G. Mistri, Surat (IN); Akhtar Husein G. Mistri, Surat (IN)

(72) Inventors: Akhtar Husein G. Mistri, Surat (IN); Zakir Husein G. Mistri, Surat (IN)

( * ) Notice: Subject to any disclaimer, the term of this patent is extended or adjusted under 35 U.S.C. 154(b) by 573 days.

(21) Appl. No.: 16/346,464

(22) PCT Filed: Apr. 13, 2017

(86) PCT No.: PCT/IN2017/000081
§ 371 (c)(1),
(2) Date: Apr. 30, 2019

(87) PCT Pub. No.: WO2018/087774
PCT Pub. Date: May 17, 2018

(65) Prior Publication Data
US 2019/0267874 A1    Aug. 29, 2019

(30) Foreign Application Priority Data
Nov. 11, 2016  (IN) ............................. 201621038547

(51) Int. Cl.
| | |
|---|---|
| *B22D 17/10* | (2006.01) |
| *B22D 17/22* | (2006.01) |
| *H02K 15/00* | (2006.01) |
| *H02K 17/16* | (2006.01) |
| *H02K 17/00* | (2006.01) |

(52) U.S. Cl.
CPC ......... *H02K 15/0012* (2013.01); *B22D 17/10* (2013.01); *B22D 17/22* (2013.01); *H02K 15/00* (2013.01); *H02K 17/00* (2013.01); *H02K 17/16* (2013.01); *Y02P 80/30* (2015.11)

(58) Field of Classification Search
CPC ........ B22D 17/00; B22D 17/10; B22D 17/22; B22D 17/24
USPC ....... 164/303, 312, 332, 333, 334, 340, 341, 164/342; 29/598
See application file for complete search history.

(56) References Cited

U.S. PATENT DOCUMENTS

| | | | | |
|---|---|---|---|---|
| 4,886,106 A | * | 12/1989 | Bennett .................. | B22D 17/18 164/70.1 |
| 5,332,026 A | * | 7/1994 | Thieman et al. ...... | B22D 17/12 164/109 |
| 6,206,080 B1 | * | 3/2001 | Ji .......................... | B22D 17/10 164/334 |

* cited by examiner

*Primary Examiner* — Kevin P Kerns
(74) *Attorney, Agent, or Firm* — D'Ambrosio & Menon, PLLC; Usha Menon

(57) ABSTRACT

A pressure die casting process and its machine are described to produce a highly efficient copper rotor for AC induction motors widely used in various industries. The pressure die casting process and the machine facilitate improvement in efficiency and performance of AC induction motors by providing maximum filling of copper with minimum porosity. Thus, a compact and convenient method is provided to cast a wide range of copper rotors of various extensive length.

15 Claims, 9 Drawing Sheets

MACHINE AND PROCESS OF COPPER ROTOR DIE CASTING USED IN AC ELECTRIC MOTOR

CROSS-REFERENCE TO RELATED APPLICATION

This application claims priority to Indian application number 201621038547 filed on Nov. 11, 2016 which is incorporated herein by reference in its entirety.

FIELD OF THE INVENTION

This invention relates to pressure die casting process and its machine to produce highly efficient copper rotors used in AC Induction Motors. The invention is made in melting and casting process as well as die casting machine and its components. This invention will improve performance of AC Induction motor widely used in various industries. At the same time, the present invention will also reduce cost, complexity, space and time for production of copper rotor. Subsequently, this invention is simplifying rotor casting process and reducing the overall cost of copper rotor.

Prior Art and Problem to be Solved

Loss in Electrical Conductivity

While melting the raw copper, Excessive Pickup of oxygen in copper will significantly decrease electrical conductivity of copper rotor. Losing electrical conductivity of copper rotor will effect motor performance. It will decrease overall efficiency of motor.

Prior Art 1

In one of the prior art, copper is melted in an Induction furnace wherein the crucible top is kept open. In this procedure, the copper will gain additional oxygen from atmosphere during melting process. Copper rotor produced by this process will subsequently containing additional oxygen mixed with copper. The additional oxygen in copper rotor will significantly reduce the electrical conductivity to the extent level. Hence, the AC Induction motor will consume more electricity due to rotor losses.

Prior Art 2

In another prior art, copper is melted in furnace wherein the furnace top is covered with nitrogen+hydrogen gas. In this prior art, the melting copper is isolated from atmosphere using nitrogen+hydrogen gases as a gas cover. This process is partly effective however it is much expensive. Even though it reduces the gaining of additional oxygen, the finished copper rotor is containing additional oxygen up to 2000 ppm or more. The additional gaining of oxygen will significantly affect the efficiency of AC induction motor.

Solution Provided in Present Invention

In the present invention, copper is melted in an induction furnace wherein the furnace top is fully covered with clay graphite cover. Wherein the clay graphite cover will isolate the copper from atmosphere during melting process. Unlike the first prior art, the invented process will prevent the copper from gaining additional oxygen from the atmosphere during melting process. The invented process is effective to the extent level. The finished copper rotor produced by the invented process will reduce oxygen in copper as low as up to 300 ppm additional oxygen.

The rotor produced by the invented process is containing significantly lower ratio of oxygen in comparison to prior art. By controlling the ratio of oxygen in copper, the invented process will produce high efficiency copper rotor and decrease the rotor losses in motor and thus saving the electricity and increasing the overall efficiency of motor.

Waste of Raw Material in Prior Arts

During casting process, molten copper is injected in rotor stack through gate cavity. Gate cavity will guide the molten copper to be filled in rotor stack. Gate cavity contains ways for flowing molten copper. At the end of casting process the melted copper is solidified in rotor stack as well as in said flowing ways. While the rotor is Ejected from casting machine, the solidified copper is integrated with rotor stack as well as flowing way inside gate cavity. The copper casted in gate cavity is called as "Runner" which is excessive and will be removed from the rotor after the casting process.

In prior arts, the melting copper is gaining excessive oxygen from the atmosphere hence the said "Runner" will contain excessive oxygen. In prior arts the said "Runner" cannot be reused as raw material in next cycle as it will gain excessive oxygen during re-melting. In prior art if the runner is reused as raw copper, the ratio of oxygen will be doubled. Hence, in the prior arts, the "Runner" (made from copper) is scrapped every time.

Solution Provided in Present Invention

In the present invention, the molten copper is gaining merely up to 300 ppm additional oxygen from atmosphere. Copper in the "Runner" is still having great electrical conductivity. Hence, the said "Runner" can be reused as raw copper material in next cycle of melting and casting of copper rotor without compromising electrical conductivity of finished rotor.

Cost Effective Melting Process

In the second prior art the furnace top is covered with nitrogen+hydrogen gas to isolate the melting copper from atmosphere. In comparison to the second prior art, the present invention is highly cost effective and delivering the great result.

Gate Cavity

In Prior art, during the casting process, melted copper is injected into die set, wherein the melted copper is inserted through gate cavity. Melted Copper will direct hit to the inner wall of gate cavity in full force and high velocity. At this stage, there will be high friction enhancing high temperature at entering point. Eventually the melted copper will weld and stuck with mold surface of cavity which will damage to rotor end-ring at the time of rotor ejection. Moreover, at the same time, the gate cavity will be also damaged. Such damages are sometimes repairable however they will affect die life significantly. Moreover, in prior art, the gate cavity is made from nickel based alloys which is much expensive in comparison to invented gate cavity.

In the present invention, the melted copper will pass through the gate cavity with minimum friction. The invented gate cavity will guide the melted copper to fill in rotor stack with full force and velocity without hitting inner or outer wall of cavity. Due to minimum friction, there are rare chances of welding melted copper with gate cavity. This will feature damage-free copper rotor as well as long life of gate cavity. Subsequently, the present invention is cost effective in term of minimum damage in gate cavity and copper rotor. Moreover, in comparison to the prior art, the copper rotor is not stuck or welded with gate cavity. Which enables easy ejection of end product i.e. copper rotor from the die set. Hence the present invention is cost effective and consuming less time in comparison to the prior art. Moreover, the novel gate cavity is made from medium carbon steel, which is inexpensive in comparison to nickel based alloys.

Additional Gates in Cavity

The solid core of the Copper Rotor is built with electrical steel lamination stacks. Steel lamination stacks are grouped and set in accordance to the size of copper Rotor to be casted. The copper is to be injected and solidified into the said steel lamination stack Copper Rotor is combination of steel lamination stack & solidified copper casted into steel lamination stack.

The said steel lamination stack is having slot finger to enable copper filling. Eventually, while using the stack having less broadness of slots finger, the stack can be de-shaped and bend into wide gates of gate cavity due to high locking pressure. During copper injection, the said slots finger are bent towards the rotor end ring due to high temperature, velocity & pressure of flowing copper. This will result into rotor failure. To prevent this eventual problem, another invention is made in the said gate cavity. To solve the problem, the cavity having four gates is used following the same principle of friction free flow. Wherein the width of flowing ways are divided into four gates. This prevents the stack to bend during locking pressure.

Porosity

In rotor casting process, the melted copper is injected into die from the gate cavity. Gate cavity is the first component of casting machine from where melted copper is guided to fill rotor stack.

In prior art, the melted copper flow is creating high friction while passing through the gate cavity. The melted copper flow directly hits to the inner wall of gate cavity in full force and high velocity, which creates the obstacle in flow and decreasing the force of melted copper flow. The force and velocity of melted copper are significantly affected in prior art.

Subsequently, the porosity will remain in solidified copper. Porosity in copper rotor will significantly decreases the efficiency of induction motor. It will also increase the power consumption as well as heat. In case of high porosity, the end product i.e. copper rotor will not be usable in induction motor, which will waste the entire process, energy, raw material and time consumed for casting the copper rotor. Finally the copper rotor will be scrapped.

Solution Provided in Present Invention

The invented gate cavity is featuring bigger, broader and deep Gate ways, up to 90% of the height of end ring. In the present invention, Gate ways are guiding flow of the melted copper in such a way which will prevent direct hit to inner or outer wall. Wherein the melted copper will flow through side walls. These features enabling obstacle-free flow of melted copper. The force and velocity is merely affected while passing through gate cavity. The melted copper is passed with full force and velocity and the entire force, velocity and pressure is applied to filling process. Hence the melted copper will entirely fill into rotor stack enabling the minimum porosity in finished product i.e. copper rotor. Unlike the prior art, the invented gate cavity will produce a highly efficient copper rotor with minimum waste of energy, raw material and time.

Efficiency of "Core Length Segment" and Horizontal Ejection of Rotor

"Core Length Segment" is a part of copper casting machine. Copper rotor is casted inside this segment. Core length segment will keep holding the rotor stack until the melted copper is fully injected and fully solidified. Once melted copper is fully casted in rotor stack, the rotor will be ejected from core length segment.

In prior art this segment is made from hot work steel H-13. Wherein, during casting process, significant thermal shock is created by the thermal cycling from molten copper being injected into the die. Continuous thermal cycling leads to thermal fatigue cracking or "heat checking". The said heat checking cracks will grow gradually resulting into damaging inner surface of core length segment. Cracks grow to the extent that the molten copper will penetrate in the said cracks. Hence, horizontal ejection is not possible as casted rotor is affixed with inner surface of core length segment.

Finally, to overcome this problem, core length segment is halved into two equal fractions in prior art. As this segment is divided in only two fractions, each fraction is very heavy in weight. It requires much energy, manpower and time to load "core length segment" into casting machine. The same way it will require much resources to change "core length segment" for casting rotor of different size. The upper fraction is movable by hydraulic cylinder from where the casted rotor can be ejected at the end of casting process in the prior art. The said fraction shaped design of core length segment is very expensive to make as it made as a single & long piece of metal. Moreover, a separate pair of core length segment is required for all different size of copper rotor to be casted. For example, the core length segment which is used to cast rotor of 100 millimetre length will NOT usable to cast rotor of 150 millimetre length. A separate pair of longer "Core Length Segment" will be required, which makes the prior art much expensive.

Solution Provided in Present Invention

In the present invention, the said "Core Length Segment" is made from CI Casting material. Thermal fatigue cracking or "heat checking" is not affecting the inner surface of invented core length segment made from CI Casting material. Hence, the casted rotor is not affixed with inner surface of invented core length segment.' Thus, in invented core length segment, the casted rotor can be ejected horizontally.

Horizontal ejection in the present invention has enabled multi-sectional design of core length segment. Because of this feature the invented segment could be made in sectional design. The length of "core length segment" call be increased or decreased by adding or removing section of core length segment. The solution provided in present invention enables adjustable core length segment, which can be used to cast rotor of various length. For example, the "core length segment" used to cast rotor of 100 mm length, the same core length segment can be used to cast rotor of 125 mm simply by adding an extra section of 25 mm in "core length segment". This feature saves time, energy and manpower required for casting rotor, especially to cast rotor of various length sequentially. It also saves overall cost of machine as it can be used to cast rotor of various length. It further simplifies the overall casting process by enabling easy ejection of casted rotor. Moreover, the invented "core length segment" is divided in multiple sections, it can be loaded & unloaded easily in comparison to prior art.

In comparison to the prior art, the invented "Core Length Segment" is also decreasing the cost of casting machine in multiple ways. Firstly, it is made in sections. Small sections are less expensive to produce in comparison to a huge size "halved fraction" of prior art. Secondly, the invented "Core Length Segment" is made from Ci Casting material. While in prior art the said segment is made from "hot work steel R-13" which is much expensive in comparison to Ci casting material of invented "Core Length Segment".

Locking Pressure and Opening Stroke of Casting Machine

During the casting process, the melted copper is injected in rotor stack using high pressure by hydraulic cylinder. At the same time the machine die must be locked with high pressure so that the die will not be opened due to pressure of injecting piston.

In prior art, the casting machine is made in three plate design. Wherein the locking is maintained by clamping system. The traditional clamping system of prior art is having limitation in length. It can be used to cast rotor of limited length generally up to 300 mm. To cast higher length rotor, for example more than 300 mm the entire casting machine must be redesigned to increase the opening stroke of damping system. Such extensive design of casting machine is difficult, technically non-viable and much expensive because it will increase the size of overall machine. Moreover, such machine will require extensive space for operation.

Solution Provided in Present Invention

In the present invention, the casting machine is made in four plates design. Wherein the locking pressure is applied and maintained by hydraulic pressure locking system. The hydraulic locking cylinder attached in fourth plate will apply and maintain locking pressure during casting process. The four plate design of invented casting machine is much compact in comparison to clamping system of prior art. The present invention provides Extendable Opening Stroke of Machine wherein the opening stroke can be extended by increasing the distance between primary plates. This feature enables to cast rotor with extensive length up to 1000 mm and more.

Extendable Ejection Stroke of Hydraulic Ejection System

In the present invention, the hydraulic ejector set is highly adjustable as per requirement to cast & eject extended copper rotor. The hydraulic ejector set with capacity of 1000 mm can be used to eject rotor of 5 mm up to 1000 mm. To cast & eject copper rotor longer than 1000 mm, the previous ejector set can be replaced with extended hydraulic ejector cylinder.

The four plate design of casting machine enables to use various length of hydraulic ejector set simply by increasing distance between Running Primary Plate and Second Primary Plate of machine. The said distance can be increased by using extended coupling stud as per the requirement.

OBJECTS OF THE INVENTION

The principle object of the invention is to provide a compact "Copper rotor die casting machine" which can be used to cast wide range of copper rotor of various length from 5 mm up to 1000 mm and more.

Another object of the invention is to improve electrical conductivity of copper rotor by decreasing excessive oxygen pickup during melting process.

Another object of the invention is to provide a process to cast porosity free copper rotor and featuring maximum copper filling. This will affect the overall efficiency of AC motor.

Another object of the invention is to simplify the overall process of copper rotor die casting starting from melting copper till the ejection of casted copper rotor. Further, to decrease the overall cost of casting machine and casting process.

Another object of the invention is to provide a low cost process of copper rotor die casting featuring less wastage of raw material.

A further object of the invention is to provide a low cost process of melting copper wherein the molten copper will gain minimum oxygen from the environment.

Another object of the present invention is to decrease waste of raw material in copper rotor casting process.

Another object of the invention is to provide low cost, highly efficient die set for die casting machine.

A further object of the present invention is to increase the length of opening stroke of casting machine. Which will increase the capacity of casting machine to cast copper rotor of extended length.

Another object of the present invention is to save time while changing the dies. Dies can be changed much faster in comparison to the prior art.

SUMMARY OF THE INVENTION

The present invention is proving a distinguishing low cost and less complicated process of copper rotor die casting. The present invention is having novel method in comparison to prior arts.

The present invention is providing a novel process of melting copper wherein the melted copper will gain minimum oxygen from environment during melting and casting process.

The invented compact design of casting machine is capable to cast copper rotor of various extensive length. The invention is also made in various components of casting machine.

Further, the present invention is providing an ideal gate cavity featuring maximum copper filling with minimum porosity in casted copper. Copper rotor with maximum filling and less porosity will improve overall performance of AC Motor. Moreover, the novel gate cavity is made from inexpensive, medium carbon steel. In prior art the gate cavity is made from nickel based alloys which is much expensive in comparison to medium carbon steel.

Moreover, the present invention is providing a low cost core length segment featuring adjustable length. A wide range of copper rotor with various length can be casted much easily in comparison to prior art.

The invented "Copper rotor die casting machine" is having compact design however it can cast wide range of copper rotor of various length. The invented "four plate design" of casting machine is increasing the length of opening stroke of casting machine. Which will increase the capacity of casting machine to cast copper rotor of extended length.

BRIEF DESCRIPTION OF THE ACCOMPANYING DRAWINGS

DETAILED DESCRIPTION OF THE PREFERRED EMBODIMENTS

The invented copper rotor die casting machine consists of various component. Mainly, consist of four primary plates namely "First Primary Plate" 1, "Second Primary Plate" 2, "Running Primary Plate"3, "End Primary Plate"4. All the other components are attached with said four primary plates. "First Primary Plate"1 and, "End Primary Plate"4 are permanently fixed into machine table 23. However the said plates can be moved if required eventually to cast extra-long copper rotor of extensive size.

A description will be given of an embodiment in accordance with the present invention with reference to the accompanying drawings. The present invention can be performed in following steps.

Step-1 Melting Copper

Copper is melted in high frequency induction furnace wherein the furnace top is fully covered with clay graphite cover (not shown). The clay graphite cover will isolate the copper from atmosphere during melting process. Unlike the prior art, the invented melting process will prevent the copper from gaining additional oxygen from the atmosphere during melting process. The finished copper rotor produced by the invented method will merely gain as low as up to 300 ppm additional oxygen.

Step-2 Preparing Steel Lamination Stack

The solid core of the Copper Rotor 8 is built with "stack"7 of electrical steel laminations. In the second step, steel lamination stack 7 are grouped and set in accordance with the size of copper Rotor 8 to be casted. Then the said steel lamination stack 7 is fitted into "Core Length Segment"9. In further step, melted copper is to be injected and solidified into the said steel lamination stack 7. Copper Rotor 8 is combination of steel lamination stack & solidified copper casted into steel lamination stack 7. In other words, the said steel lamination stack 7 is converted into die casted Copper Rotor 8 at the end of casting process.

Figure 9:
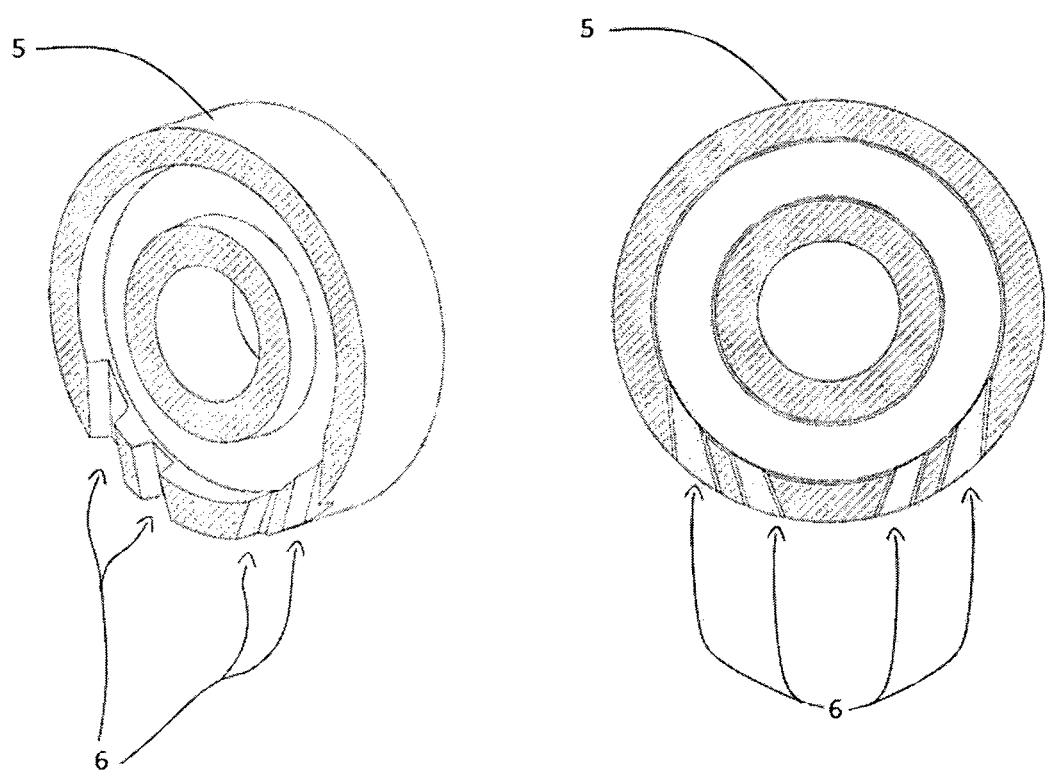
FIG. 9 is fragmentary section of casting machine and illustrating the gate cavity having four gates.

The said steel lamination stack is having slot finger to enable copper filling. Eventually, while using the stack having less broadness of slots finger, the stack can be de-shaped and bend into wide gates of gate cavity due to high locking pressure. To solve this eventual problem, the cavity having four gates is used as illustrated in FIG. 9. Wherein the width of "Flow Ways" 6 are divided into four gates. This prevents the stack to bend during injecting process. The number of gates in cavity can be increased as per requirement.

Step-3 Assembling Core Length Segment

Figure 2:
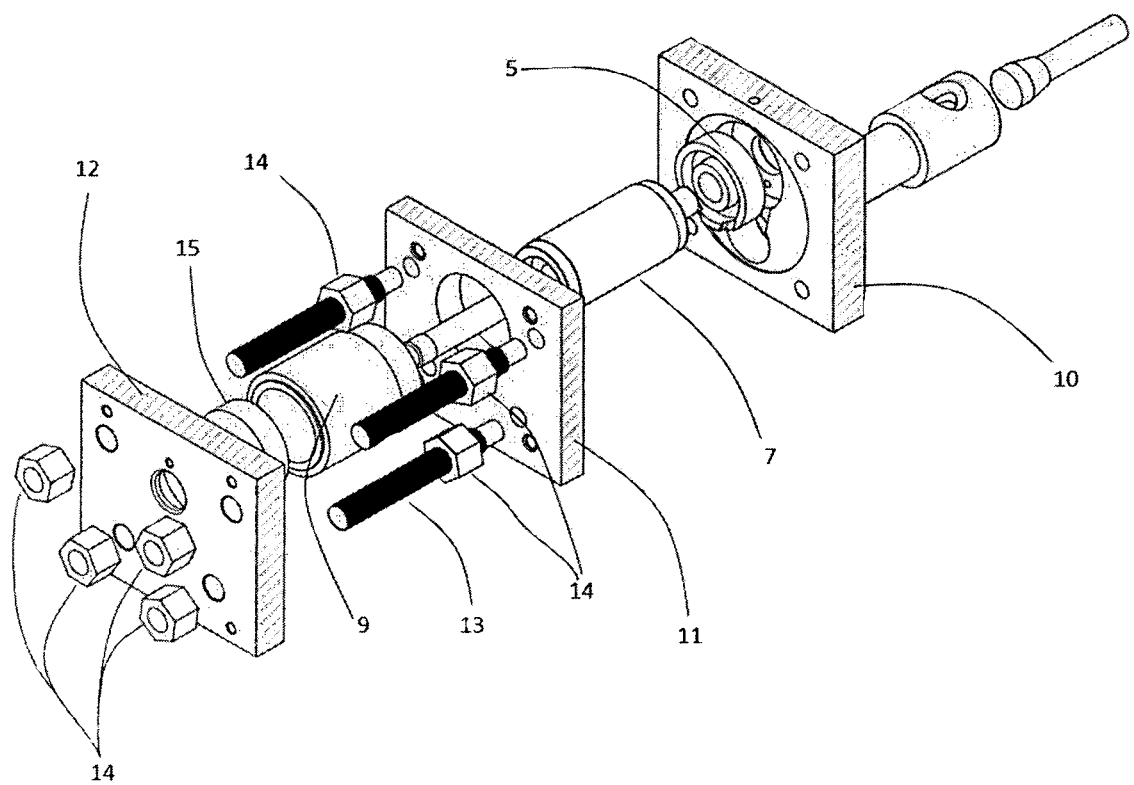
FIG. 2 is a fragmentary section of casting machine and illustrating assembly of die set component.

In this step, the length of "Core Length Segment"9 is set in accordance to the size of Copper Rotor 8 to be casted. "Core Length Segment"9 is fixed between "Middle Die Plate"11 and "End Die Plate" 12 using Die Holding Stud 13 & Die locking nuts 14. The Back Cavity 15 is fixed into "End Die Plate" 12 as illustrated in FIG. 2.

Figure 3:
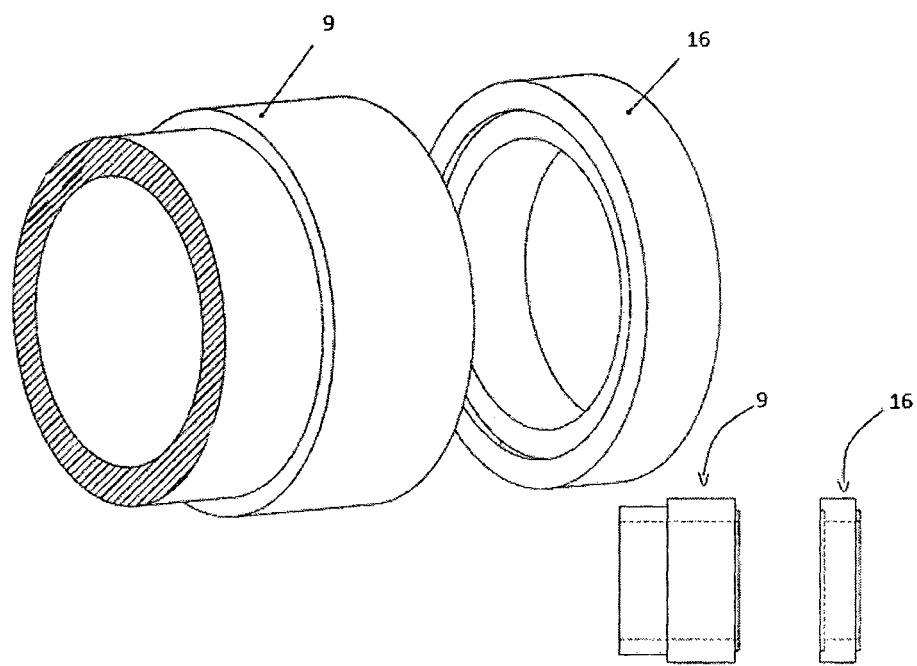
FIG. 3 is another fragmentary section of casting machine and illustrating the assembly of invented core length segment.

The invented "Core Length Segment" 9 is having multi sectional design featuring adjustable core length. As illustrated in FIG. 3, the length of "Core Length Segment"9 can be increased or decreased by adding or removing "Length Segment" 16 of core length segment. Length adjustment step became easy due to the invented Die Holding Stud 13 & Die locking nuts 14. Die Holding Stud 13 is fully threaded and hence can be easily adjusted to hold various length of core length segment 9.

Step-4 Assembling the Die Set

Die Set is assembled in this step. As illustrated in FIG. 2 Die Set is assembly of several components namely Gate Cavity 5, Gate Die Plate 10, Steel Lamination Stacks 7, Core Length Segment 9, Middle Die Plate 11, Back Cavity 15, End Die Plate 12, Die Holding Stud 13 and Die locking nuts 14.

Figure 1:
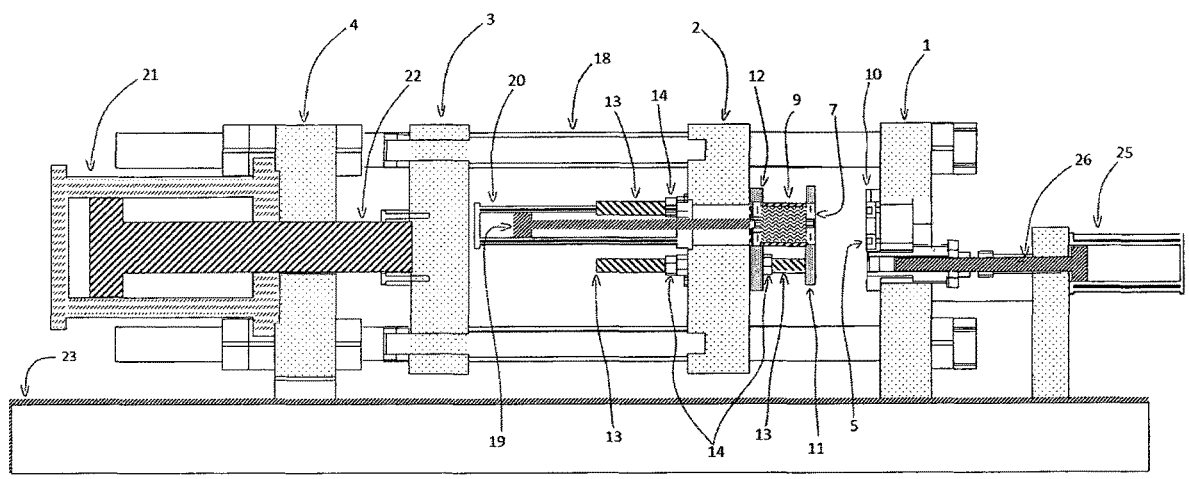
FIG. 1 is an elevational view of invented copper rotor casting machine assembled in accordance with the invention.
Figure 8:
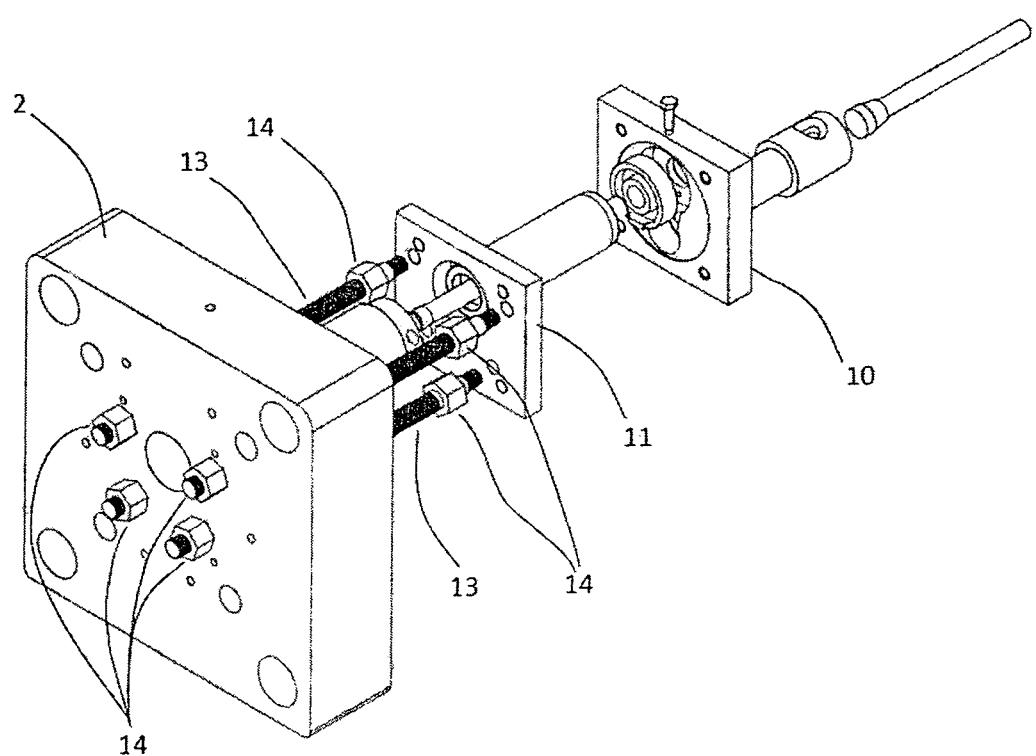
FIG. 8 is fragmentary section of casting machine and illustrating the attachment of die set assembly with primary plate.

As illustrated in FIG. 1, Gate Cavity 5, Gate Die Plate 10, is attached with "first primary plate" 1. The combination of, Steel Lamination Stacks 7, "Core Length Segment"9, "Middle Die Plate" 11, "End Die Plate" 12 is attached with "Second primary plate"2 using four sets of Die Holding Stud 13, Die locking nuts 14 as illustrated in FIG. 8.

Figure 7:
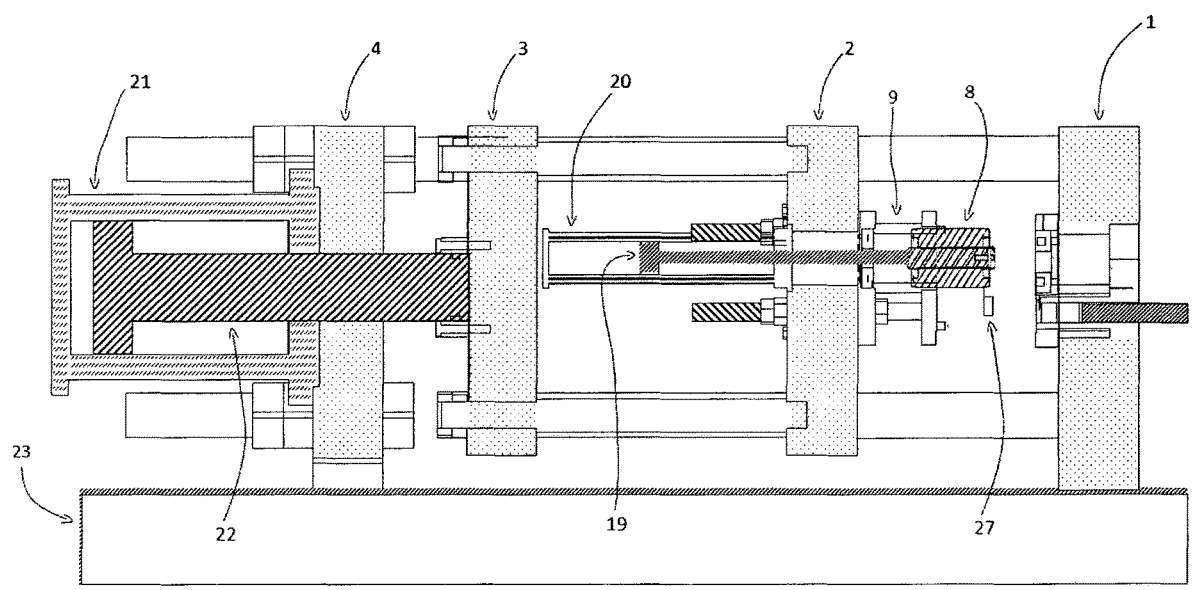
FIG. 7 is an elevational view of invented copper rotor casting machine during ejecting the caster copper rotor.

Copper Rotor 8 is casted inside "Die Set" as illustrated in FIG. 7.

Step-5 Attachment with Primary Plate

As illustrated in FIG. 1, the combination of "Core Length Segment"9, "Middle Die Plate" 11 and "End Die Plate"12 are attached with "Second primary plate" 2 using Die Holding Stud 13 & Die locking nuts 14.

At the same time, the "Gate Cavity"5 and "Gate Die Plate"10 are fixed into "first primary plate" 1.

Step-6 High Pressure Locking

Figure 4:
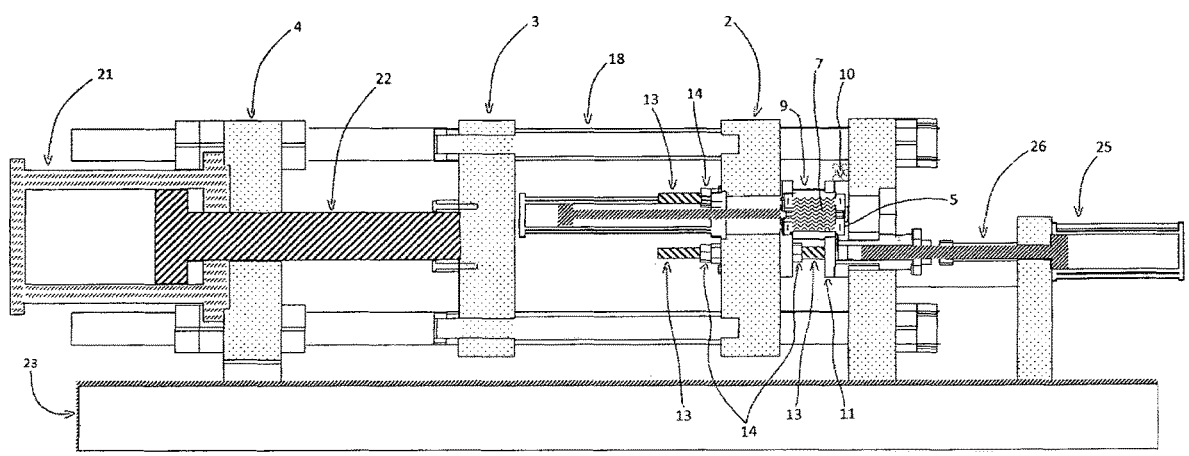
FIG. 4 is an elevational view of invented copper rotor casting machine during copper injecting process.

As illustrated in FIG. 4, the "Hydraulic locking cylinder" 21 & "locking cylinder rod" 22 will be activated. The "Hydraulic locking cylinder"21 is attached with "End Primary Plate"4. Moreover, "locking cylinder rod" 22 is joining the "Hydraulic locking cylinder"21 with "Running Primary Plate"3, as illustrated in FIG. 4.

"Hydraulic locking cylinder" 21 will push the "Running Primary Plate"3 with high pressure. As illustrated in FIG. 4, "Running Primary Plate"3 and "Second Primary Plate"2 are combined using coupling stud 18.

As a result, the hydraulic pressure will be applied on the combination of "Running Primary Plate"3 and "Second Primary Plate"2. The said combination will move towards "first primary plate"1. Finally the said hydraulic pressure will lock "Middle Die Plate"11 & "Gate Die Plate"10 with high pressure as illustrated in FIG. 4.

Step-7 Safety Lock

After high pressure locking, "middle die plate"11 is further tightly locked with "second primary plate"2 using "die holding stud"13 and die locking nuts 14. It keeps tightly holding the core length segment to prevent die opening during copper injection process as well as rotor ejection process. Molten copper is injected into core die using Hydraulic Injection Cylinder 25.

During this step, hydraulic pressure can open the die set consist of the combination of "Core Length Segment"9, "Middle Die Plate"11 and "End Die Plate"12. At this step "die holding stud"13 and die locking nuts 14 will keep holding the die. It further supports the die from bottom.

Step-8 Injecting Melted Copper

Finally, melted copper is injected using Hydraulic Injection Cylinder 25, and Injection Piston 26 with Hydraulic pressure.

Figure 5:
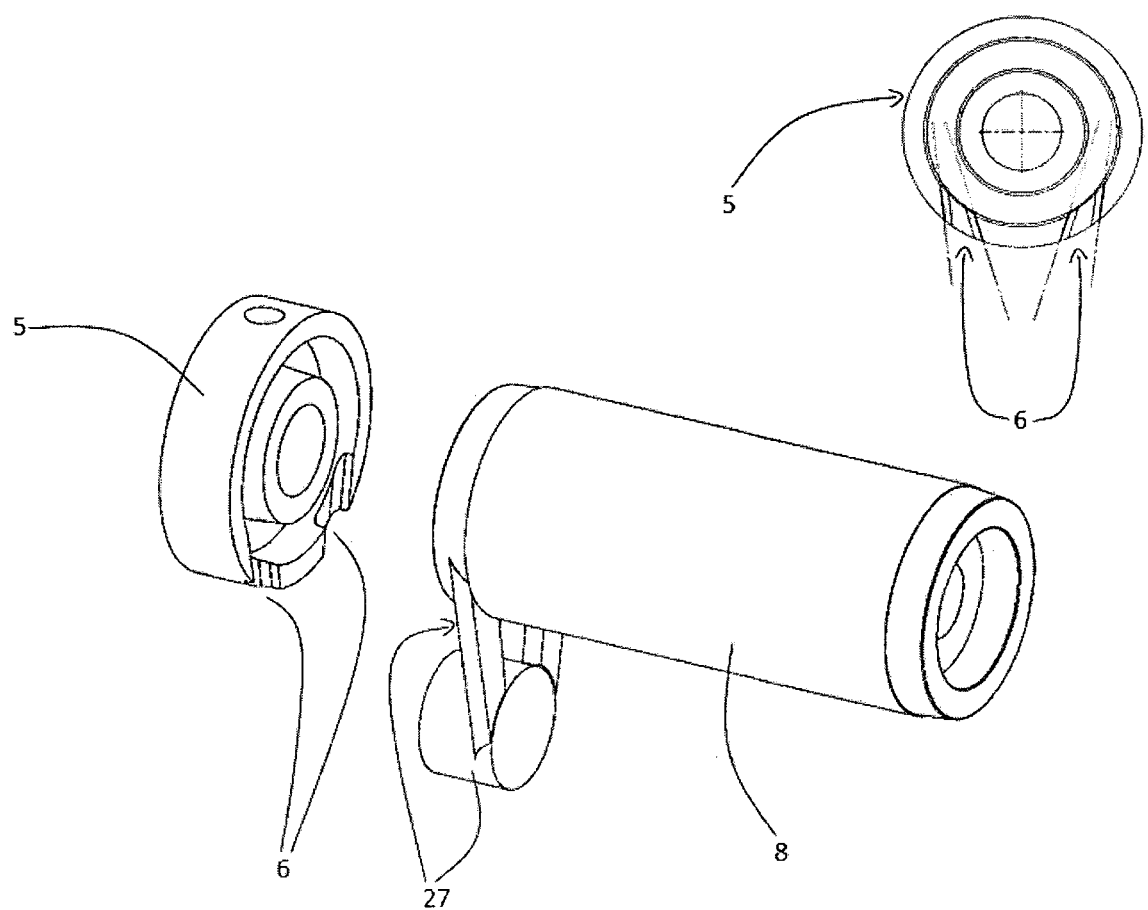
FIG. 5 is fragmentary section of casting machine and illustrating the invented gate cavity, copper rotor and runner.

As illustrated in FIG. 5, Gate cavity contains "Flow Ways" 6 for flowing melted copper. The novel "Flow Ways" 6 are designed wide and deep to enable the flow of melted copper with minimum friction. Hence, the melted copper will pass through the gate cavity 5 with minimum friction. The invented gate cavity 5 will guide the melted copper to fill in Rotor 8 stack with full force and velocity.

Novel gate cavity 5 is featuring obstacle-free flow of melted copper. Hence, entire force & velocity is applied to filling process. The melted copper will entirely fill into "steel lamination stack" 7 enabling the minimum porosity in finished product i.e. copper Rotor 8. Unlike the prior art, the invented gate cavity is featuring highly efficient copper rotor with minimum waste of energy, raw material and time.

Due to minimum friction, there are rare chances of welding melted copper with gate cavity 5. This will feature damage-free copper Rotor 8 as well as long life of gate cavity 5. Subsequently, the present invention will cost effective in term of minimum damage in gate cavity 5 and copper Rotor 8. Moreover, in comparison to the prior art the copper Rotor 8 is not stuck or weld with gate cavity 5. Which enable easy ejection of end product i.e. copper Rotor 8 from the die set. Which makes the present invention cost effective and consuming less time in comparison to the prior art.

Step-9 Solidifying the Melted Copper

Core length segment 9 will keep holding the "steel lamination stack" 7 until the melted copper is filled and fully solidified and converted to copper Rotor 8. The invented "Core Length Segment" 9 can be used to cast rotor of multiple length. For example, the "core length segment" used to cast rotor of 100 mm length, the same core length segment can be used to cast rotor of 125 mm simply by attaching an additional "Length Segment" 16 of 25 mm with "core length segment"9. This feature saves time, energy and manpower required for casting rotor, especially to cast rotor of various length sequentially. It also saves overall cost of machine as it can be used to cast rotor of various length. It further simplifies the overall casting process by enabling easy ejection of casted rotor. Moreover, the invented "core length segment"9 is divided in multiple sections, it can be loaded & unloaded easily in comparison to prior art.

Figure 6:
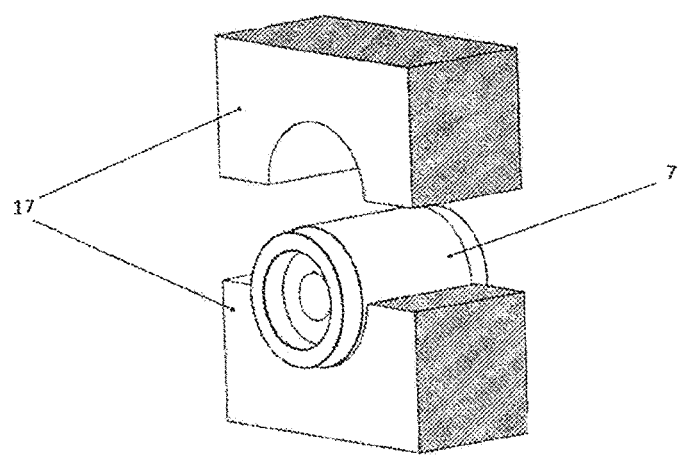
FIG. 6 is illustrating the core length segment of prior art.

As illustrated in FIG. 6, core length segment in the prior art is halved into two equal fractions. As this segment is divided in only two fractions, each fraction is very heavy in weight. It requires much energy, manpower and time to load "core length segment" into the casting machine. The same way it will require much resources to change "core length segment" for casting rotor of different size. The upper fraction is movable by hydraulic cylinder from where the casted rotor can be ejected at the end of casting process in the prior art. Moreover, in prior art, the said fraction shaped design of core length segment 17 is very expensive to make as it made as a single & long piece of metal. Further, a separate pair of core length segment 17 is required for all different size of copper rotor to be casted. For example, the core length segment 17 which is used to cast rotor 8 of 100 millimetre length will NOT usable to cast rotor of 150 millimetre length. A separate pair of longer core length Segment 17 will be required, which makes the prior art much expensive in comparison to the present invention.

Step-10 Unlocking and Opening the Die Set

As illustrated in FIG. 7, once the molten copper is fully solidified and copper rotor 8 is casted, the "Hydraulic Locking Cylinder"21 and "Locking Cylinder Rod"22 attached with End Primary Plate"4 will be activated. It will pull the combination of Running Plate 3 and Second Primary Plate 2. The extendable space between "End Primary Plate"4 and "Running Primary Plate" 3 should be grated than two times the width of copper rotor 8.

As the combination of Copper Rotor 8, "Core Length Segment"9, "Middle Die Plate" 11, "End Die Plate" 12 are attached with "Second primary plate"2 the die set will be unlocked and opened. This will create space between Middle Die Plate 11 and Gate Die Plate 10. [0073] This will enable hydraulic ejector set 19 & 20 to push and eject the copper rotor 8 from die set. This space is defined as ejecting stroke space.

To eject the copper rotor, the hydraulic locking set 21 and 22 will pull the "Running Primary Plate" 3 till the ejecting stroke space becomes greater than the length of copper rotor 8. For example, to cast copper rotor of 1000 mm, said the ejecting stroke space should be greater than 1000 mm.

As illustrated in FIG. 7, "End Primary Plate"4 and "First Primary Plate"1 are permanently fixed on Machine Table 23, however the said plates can be moved if required eventually. To cast extra-long copper rotor of extensive size, the extendable space between "End Primary Plate"4 and "Running Primary Plate" 3 can be further extended by increasing the distance between "End Primary Plate" 4 and "First Primary Plate"1 should be increased.

Step-11 Horizontal Ejection of the Casted Copper Rotor

As illustrated in FIG. 7, the "Ejection Piston Rod" 19 and "Hydraulic Ejector Cylinder"20 are attached with "Second Primary Plate"2. Once melted copper is fully casted and solidified in steel lamination stack 7, "Hydraulic Ejector Cylinder"20 and "Ejection Piston Rod" 19 will be activated and eject the casted copper Rotor 8 from core length segment 9.

The novel "Core Length Segment"9 is made from CI Casting material and 2% nickel. Thermal fatigue cracking or "heat checking" is not affecting the inner surface of invented core length segment 9. Further, CI Casting material is softer in comparison to steel. Moreover, in comparison to conventional steel material, invented core length segment's shape is not affected by heat during casting cycles. Hence, the casted rotor 8 is not affixed with inner surface of invented core length segment 9 as CI Casting material property. Thus, in invented core length segment, the casted rotor can be ejected horizontally without jamming.

As illustrated in FIG. 6, core length segment 17 of prior art is made from hot work steel H-13. Wherein, during casting process, significant thermal shock is created by the thermal cycling from molten copper being injected into the die. Continuous thermal cycling leads to thermal fatigue cracking or "heat checking". The said heat checking cracks will grow gradually resulting into damaging inner surface of core length segment. Cracks grow to the extent that the molten copper will penetrate in the said cracks. Hence, horizontal ejection is not possible as casted rotor is affixed with inner surface of core length segment.

Extending Ejection Stroke of Hydraulic Ejector Set 19 & 20 as Per Requirement

The hydraulic ejector set 19 & 20 with capacity of 1000 mm can be used to eject rotor of 5 mm up to 1000 mm. To cast & eject copper rotor longer than 1000 mm, the previous ejector set 19 & 20 can be replaced with extended hydraulic ejector set. The four plate design of casting machine enables to use various length of hydraulic ejector set 19 & 20 simply by increasing distance between Running Primary Plate"3 and "Second Primary Plate"2. The said distance can be increased by using extended coupling stud 18 as per the requirement.

Step-12 Removing Runner from Copper Rotor

At the end of casting process the molten copper is solidified in steel lamination stack 7 as well as in "flow ways" 6, as illustrated in FIG. 5. While the rotor is ejected from casting machine, the solidified copper is integrated with copper rotor 8 as well as "flow ways"6. The copper casted in gate cavity is called as Runner 27 which is excessive copper attached to the rotor and will be removed from the rotor 8.

Step-13 Reusing Runner as Raw Material

Melted copper in the present invention is gaining merely up to 300 ppm additional oxygen from atmosphere due to invented melting process as illustrated in Step-1. Copper in the Runner 27 is still having good electrical conductivity. Hence, the Runner 27 can be reused as raw copper material in next cycle of melting and casting of copper rotor without compromising electrical conductivity of finished rotor.

In prior arts, the melting copper is gaining excessive oxygen from the atmosphere hence Runner 27 will contain excessive oxygen. In prior arts Runner 27 cannot be reused as raw material in next cycle of casting as it will gain excessive oxygen during re-melting. In prior art if the runner is reused as raw copper, the ratio of oxygen will be doubled in re-melted copper. Hence, in the prior arts, the Runner 27 is scrapped every time.

We claim:

1. Apparatus to produce a copper rotor used in AC induction motors, the apparatus comprising:
   a hydraulic injection cylinder and an injection piston to inject molten copper into a steel lamination stack;
   a first primary plate holding a gate die plate and a gate cavity to allow a flow of the molten copper in the steel lamination stack;
   a second primary plate holding a die set comprising an adjustable core length segment, a middle die plate, and an end die plate, wherein the adjustable core length segment is configured between the middle die plate and the end die plate to hold the steel lamination stack;
   a running primary plate coupled with the second primary plate such that the running primary plate and the second primary plate are movably configured;
   an end primary plate; and
   a hydraulic locking cylinder coupled with the end primary plate, the hydraulic locking cylinder being connected to the running primary plate through a locking cylinder rod slidably configured with the hydraulic locking cylinder,
   wherein the locking cylinder rod is configured to move the running primary plate towards the first primary plate to lock the middle die plate with the gate die plate.

2. Apparatus as defined in claim 1, wherein the gate cavity is made from medium carbon steel.

3. Apparatus as defined in claim 1, wherein the gate cavity has wide gate ways to flow molten copper featuring the copper rotor as porosity free and facilitating damage free ejection of the copper rotor.

4. Apparatus as defined in claim 1, wherein the height of gate ways of the gate cavity is 90% of the height of an end ring.

5. Apparatus as defined in claim 1, wherein the gate cavity has two gates to flow melted copper.

6. Apparatus as defined in claim 1, wherein the gate cavity has four gates to flow melted copper.

7. Apparatus as defined in claim 1, wherein the gate cavity has more than four gates to flow melted copper.

8. Apparatus as defined in claim 1, wherein the core length segment is made in multi-sections featuring adjustment of a length of the core length segment in accordance to the length of the copper rotor to be casted.

9. Apparatus as defined in claim 1, wherein the core length segment is made from cast iron (CI) casting material preventing thermal fatigue cracking in the core length segment.

10. Apparatus as defined in claim 1, wherein the core length segment is made from 98% cast iron (CI) casting material and 2% nickel.

11. Apparatus as defined in claim 1, wherein the die set comprises die holding studs and nuts to keep holding and supporting the die set.

12. Apparatus as defined in claim 1, wherein a hydraulic locking cylinder is attached with the end primary plate to apply and maintain locking pressure on the running primary plate.

13. Apparatus as defined in claim 1, wherein the running primary plate and the second primary plate are combined using a coupling stud.

14. Apparatus as defined in claim 1, wherein the apparatus comprises an opening stroke configured as extendable, enabling to cast the copper rotor of various length from 5 mm up to 1000 mm.

15. Apparatus as defined in claim 1, wherein the apparatus comprises a hydraulic ejector, and wherein the hydraulic ejector comprises an ejecting stroke configured as extendable, enabling to cast the copper rotor of various length from 5 mm up to 1000 mm.

* * * * *